(12) United States Patent
Kotlar et al.

(10) Patent No.: US 7,341,979 B2
(45) Date of Patent: Mar. 11, 2008

(54) WELL TREATMENT METHOD

(75) Inventors: Hans Kristian Kotlar, Stavanger (NO); Olav Martin Selle, Stavanger (NO); Oddvar Arnfinn Aune, Stavanger (NO); Lars Kilaas, Stavanger (NO); Anne Dalager Dyrli, Stavanger (NO)

(73) Assignee: Statoil ASA, Stavanger (NO)

( * ) Notice: Subject to any disclaimer, the term of this patent is extended or adjusted under 35 U.S.C. 154(b) by 216 days.

(21) Appl. No.: 10/432,281

(22) PCT Filed: Nov. 19, 2001

(86) PCT No.: PCT/GB01/05089

§ 371 (c)(1),
(2), (4) Date: Oct. 27, 2003

(87) PCT Pub. No.: WO02/40828

PCT Pub. Date: May 23, 2002

(65) Prior Publication Data

US 2004/0074646 A1    Apr. 22, 2004

(30) Foreign Application Priority Data

Nov. 20, 2000  (GB) ................................. 0028269.9

(51) Int. Cl.
*E21B 40/00*    (2006.01)

(52) U.S. Cl. ...................................... 507/221; 507/226
(58) Field of Classification Search ................ 507/902, 507/219, 221, 225, 226, 939
See application file for complete search history.

(56) References Cited

U.S. PATENT DOCUMENTS

| 4,670,166 | A | * | 6/1987 | McDougall et al. | ......... 507/224 |
| 4,738,897 | A | * | 4/1988 | McDougall et al. | ......... 428/402 |
| 5,437,331 | A | | 8/1995 | Gupta et al. | |
| 5,465,792 | A | * | 11/1995 | Dawson et al. | ............. 166/295 |
| 5,893,416 | A | * | 4/1999 | Read | ........................... 166/304 |
| 5,964,291 | A | * | 10/1999 | Bourne et al. | .............. 166/279 |
| 6,169,058 | B1 | * | 1/2001 | Le et al. | ..................... 507/222 |
| 6,329,324 | B1 | * | 12/2001 | Brueggemann et al. | ..... 504/363 |

FOREIGN PATENT DOCUMENTS

| EP | 0 193 369 | 9/1986 |
| EP | 0 261 865 | 3/1988 |
| NO | 314097 | 10/1997 |
| WO | WO 90 22537 | 11/1993 |

* cited by examiner

Primary Examiner—Kuo-Liang Peng
(74) Attorney, Agent, or Firm—Sughrue Mion, Pllc.

(57) ABSTRACT

The invention provides a method for the treatment of a hydrocarbon well which method comprises administering, down the well, inverse suspension polymerized polymer particles having immobilized therein a well treatment chemical or a precursor or generator thereof.

12 Claims, No Drawings

WELL TREATMENT METHOD

CROSS-REFERENCE TO RELATED APPLICATION

This application is a 371 of PCT/GB01/05089, filed Nov. 19, 2001, the disclosure of which is incorporated herein by reference.

This invention relates to a method of treating a hydrocarbon well with well treatment chemicals, in particular by down-hole placement of polymeric particles carrying well treatment chemicals or precursors or generators thereof, and to such particles and compositions and structures containing them.

During the operation of a hydrocarbon well (i.e. a gas or oil well) various down-hole problems arise such as corrosion of metal fittings, hydrocarbon flow-inhibiting deposition (e.g. of scale, gas clathrates, metal sulphides, waxes, gel polymers, microbial debris, etc.), generation of toxic hydrogen sulphide by sulphate-reducing bacteria, increased water flow into the producer bore, etc.

Thus, for example, where sea water is injected through an injection bore hole into an oil-bearing stratum to drive oil through the formation (i.e. the rock) into the producer well hole, differences in solutes in the injection water and the water already present in the formation can cause metal salts to precipitate as scale so causing gradually increasing clogging of the producer well hole.

Typically this is dealt with by applying a "squeeze" of scale inhibitor chemicals, i.e. chemicals which break down the scale and increase oil or gas flow. This generally involves ceasing hydrocarbon flow, forcing an aqueous solution of the scale inhibitor down the producer bore under pressure to drive the inhibitor solution into the formation, and restarting production. Such treatment generally allows a further six or so months of hydrocarbon flow before a further squeeze is required and each squeeze causes some damage to the formation surrounding the producer bore hole and as a result an increased flow of formation fragments (i.e. rock grains etc.) into the bore.

The producer bore hole in an oil well is generally lined in the hydrocarbon bearing stratum with "gravel packs", sand containing filter elements, which serve to trap formation fragments and it has been proposed to include in such gravel packs ceramic particles coated with or impregnated with well treatment chemicals such as scale inhibitors (see EP-A-656459 and WO 96/27070) or bacteria (see WO 99/36667). Likewise treatment of the formation surrounding the producer well bore hole with well treatment chemicals before hydrocarbon production begins has also been proposed, e.g. in GB-A-2290096 and WO 99/54592.

Various polymeric, oligomeric, inorganic and other particulate carriers for well treatment chemicals are also known, e.g. ion exchange resin particles (see U.S. Pat. No. 4,787, 455), acrylamide polymer particles (see EP-A-193369), gelatin capsules (see U.S. Pat. No. 3,676,363), oligomeric matrices and capsules (see U.S. Pat. No. 4,986,353 and U.S. Pat. No. 4,986,354), ceramic particles (see WO 99/54592, WO 96/27070 and EP-A-656459), and particles of the well treatment chemical itself (see WO 97/45625).

Particles coated with well treatment chemicals, particles encapsulating well treatment chemicals in a soluble shell and porous particles impregnated with well treatment chemicals may however have the inherent problem that release of the well treatment chemical will take place relatively rapidly once the particles encounter water down-hole. Accordingly the protection they provide may be relatively short lived.

There is thus a continuing need for a means of well treatment that will provide prolonged protection.

It is therefore proposed to intimately incorporate a well treatment chemical or precursor or generator within a polymeric matrix by effecting polymerization in a discontinuous aqueous phase containing the chemical, precursor or generator, i.e. by an inverse suspension polymerization. In this way the rate of leaching of the chemical, precursor or generator may be controlled or selected by choice of particle properties (e.g. swellability, porosity, degradability, size, molecular weight, degree of crosslinking, etc.) which in conjunction with properties of the down-hole environment (e.g. temperature, pH, salinity etc.) will govern the leaching or release rate.

Thus viewed from one aspect the invention provides a method for the treatment of a hydrocarbon well which method comprises administering down said well inverse suspension polymerized polymer particles having immobilized therein a well treatment chemical or a precursor or generator thereof.

By inverse suspension polymerized is meant that the polymerization occurs in or on the surface of a discontinuous aqueous phase present in a continuous non-aqueous phase. Thus the polymerization may for example be an emulsion, dispersion or suspension polymerization.

The aqueous phase in the polymerization will contain the well treatment chemical, precursor or generator in dissolved or dispersed form and will preferably also contain a water-soluble polymerization initiator. The continuous non-aqueous phase will desirably contain a polymerization inhibitor.

The polymer will desirably be a homo or copolymer of one or more water soluble or amphiphilic monomers, e.g. monomers carrying hydrophilic moieties such as acid, hydroxy, thiol or amine groups. Suitable monomers thus include 2-acrylamide-2-methylpropanesulphonic acid (AMPS), methyl methacrylate (MMA), maleic acid anhydride (MAH), and other water-soluble monomers.

Polymerisation may be effected using conventional techniques, conditions, initiators, etc.

Viewed from a further aspect the invention provides inverse suspension polymerized polymer particles having immobilized therein a well treatment chemical or a precursor or generator thereof.

Viewed from another aspect the invention provides the use for the manufacture of hydrocarbon well treatment compositions of inverse suspension polymerized polymer particles having immobilized therein a well treatment chemical or a precursor or generator thereof.

Viewed from a still further aspect the invention comprises a hydrocarbon well treatment composition comprising a carrier liquid containing inverse suspension polymerized polymer particles having immobilized therein a well treatment chemical or a precursor or generator thereof.

Viewed from a yet further aspect the invention comprises a tubular filter for down-hole placement containing inverse suspension polymerized polymer particles having immobilized therein a well treatment chemical or a precursor or generator thereof.

In the method of the invention the polymer particles may be placed down hole before and/or after hydrocarbon production (i.e. extraction of oil or gas from the well) has begun. Preferably the particles are placed down hole before production has begun, especially in the completion phase of well construction.

The particles may be placed within the bore hole (e.g. in the hydrocarbon bearing strata or in ratholes) or within the surrounding formation (e.g. in fissures or within the rock itself). In the former case, the particles are conveniently contained within a tubular filter, e.g. a gravel pack or a filter structure as disclosed in EP-A-656459 or WO 96/27070; in the latter case, the particles are preferably positioned by squeezing a liquid composition containing the particles down the bore hole. Preferably, before production begins the particles are placed both within the bore in a filter and within the surrounding formation.

Where the particles are placed within the surrounding formation, the pressure used should be sufficient to cause the particles to penetrate at least 1 m, more preferably at least 1.5 m, still more preferably at least 2 m, into the formation. If desired, the particles may be applied in conjunction with proppant particles (e.g. as described in WO 99/54592) to achieve a penetration of up to about 100 m into the formation. Compositions comprising proppant particles and polymer particles according to the invention form a further aspect of the invention.

The particles according to the invention advantageously have mode particle sizes (e.g. as measured with a Coulter particle size analyser) of 1 µm to 5 mm, more preferably 10 µm to 1000 µm, especially 250 to 800 µm. For placement within the formation, the mode particle size is preferably 1 to 50 µm, especially 2 to 20 µm. For any particular formation, formation permeability (which correlates to the pore throat sizes in the formation) may redily be determined using rock samples taken during drilling and the optimum particle size may thus be determined. If the particles have a very low dispersity (i.e. size variation), a highly uniform deposition and deep penetration into the formation can be achieved. For this reason, the particles preferably have a coefficient of variation (CV) of less than 10%, more preferably less than 5%, still more preferably less than 2%.

CV is determined in percentage as $$CV = 100 \times \frac{\text{standard deviation}}{\text{mean}}$$

where mean is the mean particle diameter and standard deviation is the standard deviation in particle size. CV is preferably calculated on the main mode, i.e. by fitting a monomodal distribution curve to the detected particle size distribution. Thus some particles below or above mode size may be discounted in the calculation which may for example be based on about 90% of total particle number (of detectable particles that is). Such a determination of CV is performable on a Coulter LS 130 particle size analyzer.

For placement in filters, the particles preferably have mode particle sizes of 1 to 5000 µm, more especially 10 to 1000 µm, still more preferably 250 to 800 µm. In such filters, the particles preferably constitute 1 to 99% wt, more preferably 2 to 30% wt, still more preferably 5 to 20% wt of the particulate filter matrix, the remaining matrix comprising particulate oil- and water-insoluble inorganic material, preferably an inorganic oxide such as silica, alumina or aluminasilica. Particularly preferably, the inorganic oxide has a mode particle size which is similar to that of the polymer particles, e.g. within 20%, more preferably within 10%. As with the in-formation placement, the polymer particles preferably have low dispersity, e.g. a CV of less than 10%, more preferably less than 5%, still more preferably less than 2%. The low dispersity serves to hinder clogging of the filters.

The particles are preferably particles having a polymer matrix content of 5 to 95% wt, more preferably 30 to 90% wt, especially 40 to 80% wt.

Preferably the polymer matrix of the particles has a softening point above the temperatures encountered down hole, e.g. one above 70° C., more preferably above 100° C., still more preferably above 150° C.

The well treatment chemicals or precursors or generators thereof which the particles contain may be any agents capable of tackling down hole problems, such as corrosion, hydrocarbon flow reduction, or $H_2S$ generation. Examples of such agents include scale inhibitors, foamers, corrosion inhibitors, biocides, surfactants, oxygen scavengers, bacteria etc.

The material which the particles contain may be a well treatment chemical itself or a precursor chemical compound which in situ will react, e.g. break down, to produce a well treatment chemical, or alternatively it may be a biological agent, e.g. an enzyme or bacterium which produces a well treatment chemical which exerts its effect within or outside the bacterial cells.

In general, the well treatment chemicals will be oil-insoluble and water-soluble chemicals which leach out of the polymer particles when water begins to reach the bore hole or the area of the formation in which the particles are placed. Where the particles contain well treatment chemical generating bacteria, these are preferably thermophilic bacteria which in the absence of water are in a dormant phase, and especially preferably they are ultra microbacteria or nanobacteria. Generally where the particles contain bacteria, they will also be impregnated with nutrients for the bacteria, e.g. sucrose, so that bacterial growth is promoted once the particles encounter water.

Example of typical well treatment chemicals, precursors and generators are mentioned in the patent publications mentioned herein, the contents of all of which are hereby incorporated by reference.

Thus for example typical scale inhibitors include inorganic and organic phosphonates (e.g. sodium aminotrismethylenephosphonate), polyaminocarboxylic acids, polyacrylamines, polycarboxylic acids, polysulphonic acids, phosphate esters, inorganic phosphates, polyacrylic acids, inulins (e.g. sodium carboxymethyl inulin), phytic acid and derivatives (especially carboxylic derivatives) thereof, polyaspartates, etc.

Where the scale inhibitor is a polymer it may of course contain residues of one or more different comonomers.

Examples of preferred well treatment chemicals include: hydrate inhibitors, scale inhibitors, asphaltene inhibitors, wax inhibitors and corrosion inhibitors. Such inhibitors are well known to those working in the fields of well treatment.

Where the polymer partices are placed within the formation, they are preferably applied as a dispersion in a liquid carrier. For pre- and post-completion application, the liquid carrier preferably comprises a non-aqueous organic liquid, e.g. a hydrocarbon or hydrocarbon mixture, typically a $C_3$ to $C_{15}$ hydrocarbon, or oil, e.g. crude oil. For curative treatment, i.e. after production has continued for some time, the liquid carrier may be aqueous or non-aqueous.

The invention will now be described further with reference to the following non-limiting Examples:

EXAMPLE 1

Nitrilotrismethylenetriphosphonic Acid Containing Particles 6.0 g of a 51.3% wt aqueous solution of AMPS, 0.16 g of 1,2-dihydroxyethylenebisacrylamide, 3.0 g of nitrilotrismethylenetriphosphonic acid, 0.3 g of acrylamide, 2.4 g of distilled water and 125 µL of a 0.2M aqueous solution of ammonium persulphate are mixed at 20° C. to produce an aqueous mixture.

50 mL of toluene and 1.0 g of calcium stearate are mixed together and then nitrogen is bubbled through at 20° C. to produce a non-aqueous mixture.

The aqueous mixture is dispersed in the non-aqueous mixture at 20° C., the dispersion is heated to 60° C. and kept at that temperature for 40 minutes.

125 µL of a 0.2M aqueous solution of sodium metabisulphite is added and the reaction mixture is kept at 60° C. for a further 2 hours.

The polymer particles are then recovered.

EXAMPLE 2

Nitrilotrismethylenetriphosphonic Acid Containing Particles 6.0 g of a 51.3% wt aqueous solution of AMPS, 0.163 g of 1,2-dihydroxyethylenebisacrylamide, 2.0 g of acrylamide and 2.4 g of distilled water are mixed together at 20° C. is 1.5 g of nitrilotrismethylenetri-phosphonic acid is dissolved in 1.5 g distilled water and this and 125 µL of a 0.2M aqueous solution of ammonium persulphate are added to the AMPS solution to produce an aqueous mixture.

50 mL toluene, 4.0 g acetone, and 0.1 g calcium stearate are mixed and nitrogen is bubbled through at 20° C. to produce a non-aqueous mixture.

The aqueous mixture is dispersed in the non-aqueous mixture at 20° C.

125 µL of a 0.2M aqueous solution of sodium metabisulphite is added, the temperature is raised to 60° C. for two hours.

The polymer particles are then recovered.

EXAMPLE 3

Particles Containing Triphosphonate 3.6 g of sorbitan sesquioleate dissolved in a mixture of 108 mL toluene and 42 mL chloroform are placed in a flanged 250 mL flask having a temperature control blanket, a thermostat-controlled stirred circulatory water bath and a spiral stirrer. The solution is stirred at 160 rpm for 30 minutes at 4° C. under an argon atmosphere. 1.125 mL of tetramethylenediamine is added and stirring is continued for 10 minutes.

Argon is passed through a mixture of 4.2 g acrylamide, 0.21 g N,N'-methylene bis acrylamide, 0.23 g EDTA titriplex II, 22.5 mL of an aqueous pH 7.4 phosphate buffer (0.0087M $KH_2PO_4$ and 0.0184M $K_2HPO_4$) and 4.0 g of a pH 7.4 triphosphonate solution for 2 minutes and then the solution is added to 1.5 mL of an ammonium persulphate solution (produced by mixing 0.5 g ammonium persulphate and 10 mL of water). The resulting mixture is rapidly added to the solution in the flanged flask which is stirred for a further 80 minutes at 4° C.

The resulting polymer particles are separated from the reaction mixture, added to 75 mL toluene and then stirred using a magnetic stirrer. The toluene is removed and replaced by fresh toluene and stirring is repeated. The toluene is again removed and replaced by a toluene/methanol mixture and stirring is repeated. The toluene/methanol mixture is removed and replaced by methanol and stirring is repeated. The methanol is removed and the particles are dried in air at ambient temperature and then under vacuum at 40° C. for about 1 hour.

The invention claimed is:

1. Inverse suspension polymerized polymer particles having immobilized therein a well treatment chemical selected from the group consisting of a scale inhibitor, corrosion inhibitor, wax inhibitor, hydrate inhibitor, asphaltene inhibitor, foamer, biocide, surfactant, oxygen scavenger and bacteria, wherein said well treatment chemical is present in an amount of from 60 to 95% by weight, and the polymer matrix of said polymer particles has a softening point of above 100° C., and wherein the polymer particles are homopolymers or copolymers of 2-acrylamide-2-methylpropanesulphonic acid or maleic acid anhydride.

2. A method for the treatment of a hydrocarbon well which method comprises administering, down said well, the inverse suspension polymerized polymer particles as claimed in claim 1.

3. The method as claimed in claim 2, wherein said polymer particles are administered before hydrocarbon production from said well begins.

4. The method as claimed in claim 2 or 3, wherein said polymer particles are placed in a filter in the bore-hole of said well and in the formation surrounding said bore-hole.

5. The method as claimed in claim 2, wherein said polymer particles are produced by polymerization of a continuous non-aqueous phase and of a non-continuous aqueous phase, wherein said aqueous phase contains said well treatment chemical.

6. The particles as claimed in claim 1, wherein said particles are produced by polymerization of a continuous non-aqueous phase and of a non-continuous aqueous phase, wherein said aqueous phase contains said well treatment chemical.

7. A hydrocarbon well treatment composition comprising a carrier liquid containing the inverse suspension polymerized polymer particles as claimed in claim 1.

8. The composition as claimed in claim 7, wherein said polymer particles are produced by polymerization of a continuous non-aqueous phase and of a non-continuous aqueous phase, wherein said aqueous phase contains said well treatment chemical.

9. A tubular filter for down-hole placement containing the inverse suspension polymerized polymer particles as claimed in claim 1.

10. The filter as claimed in claim 9, wherein said polymer particles are produced by polymerization of a continuous non-aqueous phase and of a non-continuous aqueous phase, wherein said aqueous phase contains said well treatment chemical.

11. The particles as claimed in claim 1, wherein said well treatment chemical is present in an amount of from 70 to 95% by weight.

12. The particles as claimed in claim 1 or 11, wherein the polymer matrix of said polymer particles has a softening point of above 150° C.

* * * * *